United States Patent [19]

Davenport, Sr. et al.

[11] Patent Number: 4,585,376

[45] Date of Patent: Apr. 29, 1986

[54] SAFE LOCK DRILLING APPARATUS

[76] Inventors: William R. Davenport, Sr., P.O. Box 1390, Georgetown, Calif. 95634; Wayne T. Colborn, P.O. Box 2234, Placerville, Calif. 95667

[21] Appl. No.: 610,037

[22] Filed: May 14, 1984

[51] Int. Cl.[4] .................................... B23B 39/00

[52] U.S. Cl. .................................... 408/110; 408/136; 408/712

[58] Field of Search ................ 408/98, 109, 111, 112, 408/115 R, 136, 236, 237, 712, 714, 110, 92, 234

[56] References Cited

U.S. PATENT DOCUMENTS

| | | | |
|---|---|---|---|
| 668,137 | 2/1901 | Bradley et al. | 408/92 |
| 801,350 | 10/1905 | Williams | 408/111 |
| 2,625,063 | 1/1953 | Hanson | 408/95 |
| 2,831,376 | 4/1958 | Daniels | 408/112 |
| 3,100,408 | 8/1963 | Pufahl | 408/110 |
| 3,288,183 | 11/1966 | Eisbrenner | 408/110 |
| 3,464,295 | 9/1969 | Gallion | 408/112 |
| 3,874,810 | 4/1975 | Russell | 408/110 |
| 4,082,474 | 4/1978 | Stiger | 408/110 |

*Primary Examiner*—Gil Weidenfeld
*Assistant Examiner*—Daniel W. Howell
*Attorney, Agent, or Firm*—Mark C. Jacobs

[57] ABSTRACT

A safe lock drilling apparatus comprising a jig adapted to straddle the lock of a safe that it is desired to drill out and hold a drill motor and bit in a pre-aligned adjustable relationship to the lock thereby allowing the bit to be held perfectly still and at a fixed angle while drilling.

11 Claims, 7 Drawing Figures

SAFE LOCK DRILLING APPARATUS

BACKGROUND OF THE INVENTION

1. Field of the Invention

The invention relates to safe lock drilling apparatus; and, more particularly, to apparatus for drilling out the lock of a safe.

2. Description of the Prior Art

There are times when it is necessary to drill out the lock of a safe to gain access to the interior thereof. Devices are known in the art which straddle the lock of such safes and have legs or the like which are adjustable so that a predetermined line of drilling can be attained. Much time is wasted in attempting to adjust such units for the proper angle of drilling. Such devices have also been quite cumbersome and difficult to hold steady and adjust for the desired angle of drilling. Many drill bits, such as 18 to 20 such bits, may be broken in using such prior art devices in attempting to hold the drill bit perfectly still while drilling. Also, in drilling hardplate in safes, a high RPM is needed since the speed and drilling pressure heats up the metal being drilled and anneals the metal. Thus, it is necessary to have speed and pressure and prior art devices have been inefficient in accomplishing the same.

There is thus a need for apparatus for firmly holding a drill bit in a fixed position for drilling out the lock of a safe.

SUMMARY OF THE INVENTION

It is an object of this invention to provide improved apparatus for aligning a drill bit with the lock of a safe for drilling out the same.

It is a further object of this invention to provide such apparatus which can hold the bit perfectly still and at a fixed angle.

It is still another object of this invention to provide such apparatus which is quickly and easily adjustable.

These and other objects are preferably accomplished by providing a jig adapted to straddle the lock of a safe that it is desired to drill out and hold a drill motor and bit in a prealigned adjustable relationship to the lock thereby allowing the bit to be held perfectly still and at a fixed angle while drilling.

Other objects of the invention will in part be obvious and will in part appear hereinafter.

The invention accordingly comprises the apparatus possessing the construction, combination of elements and arrangement of parts which are exemplified in the following detailed disclosure and the scope of which will be indicated in the appended claims.

For a fuller understanding of the nature and objects of the invention, reference should be made to the following detailed description, taken in conjunction with the accompanying drawings.

DESCRIPTION OF THE PREFERRED EMBODIMENT

Figure 1:
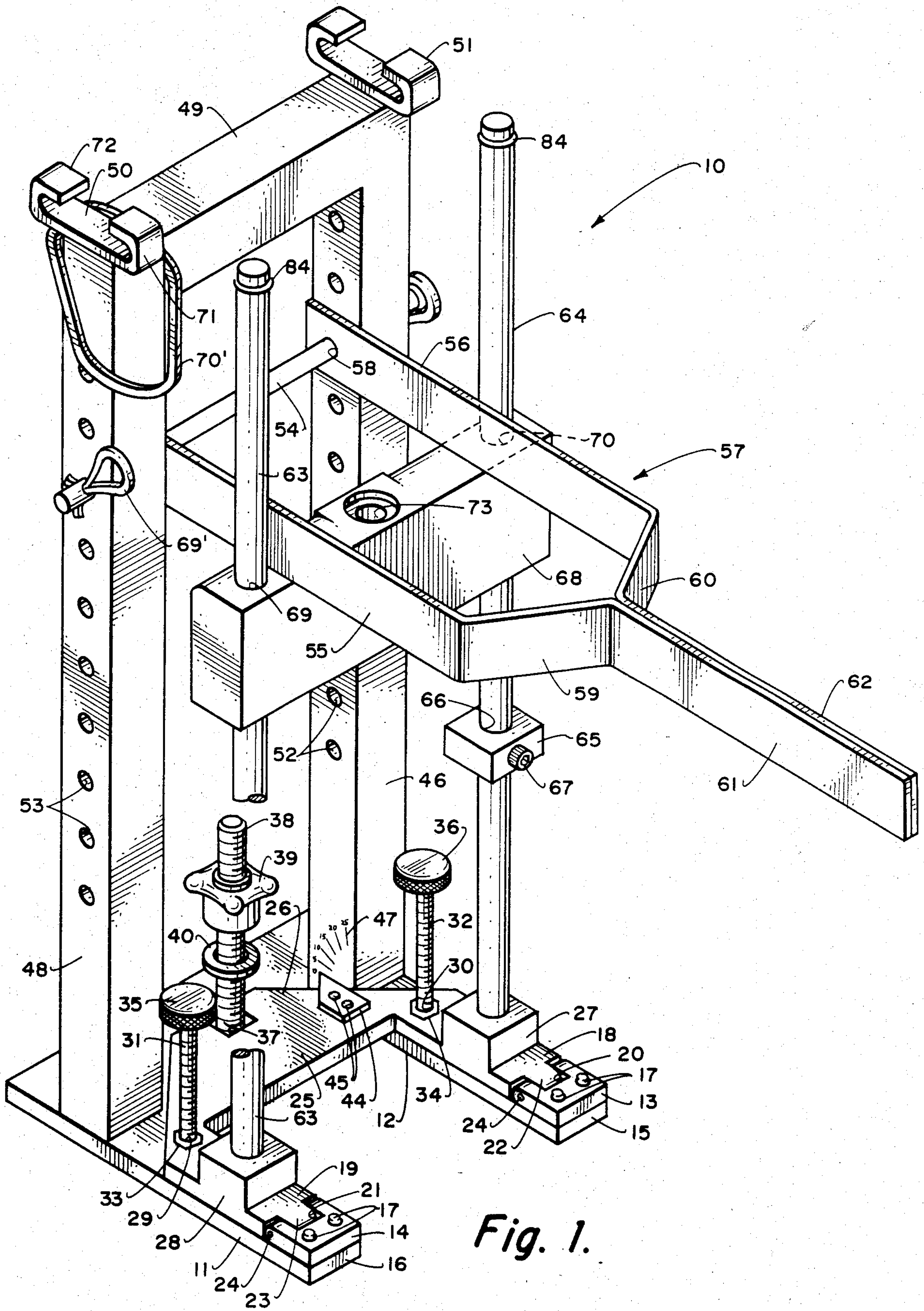
FIG. 1 is a vertical view of the jig of the apparatus of the invention with the drill and bit removed therefrom.

Referring now to FIG. 1 of the drawing, a jig 10 is shown forming part of the apparatus of the invention. Jig 10 includes a flat base plate 11 having a rectangularly-shaped cut-out section 12 (see FIG. 2). A pair of hinge plates 13,14 are provided on the upper surface of plate 11 on ends 15,16, respectively, and may be secured thereto in any suitable manner, such as by rivets 17.

Figure 3:
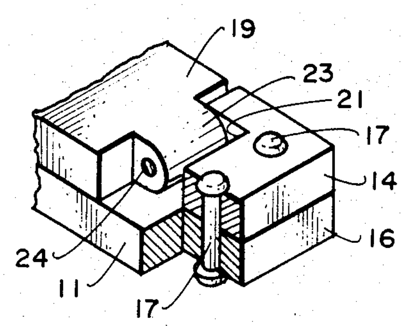
FIG. 3 is a detail view of a portion of the jig of FIG. 1 showing one step in the assembly thereof.

A pair of hinges 18,19 are pivotally secured to respective plates 13,14, as shown. The pivotal connection may be provided in any suitable manner, such as each plate 13,14 having a cut-out section 20,21, respectively, receiving therein a curved tongue 22,23 (FIG. 3) on hinges 18,19, respectively. Fixed cross-pins 24 may be provided in plates 13,14 receiving tongues 22,23 therearound for providing hinging thereto.

Hinges 18,19 form extensions of a plate 25 having a trapezoidally-shaped tilt plate 26 and bosses 27,28 integral with hinges 18,19, respectively. A pair of apertures 29,30 are provided in plate 25 adjacent respective bosses 27,28 receiving therein threaded tilt screws 31,32, respectively. Each tilt screw 31,32 has a lock nut 33,34, respectively, threaded thereon, and a knurled head 35,36, respectively. Tilt plate 26 has an opening 37 straddling a threaded bolt 38 having a turn nut 39 threaded thereon. A washer 40 is mounted on bolt 38 and, when nut 39 is tightened, it forces washer 40 against the surfaces adjacent opening 37 to lock the plate 26 in positionafter adjustment of screws 31,32.

Figure 4:
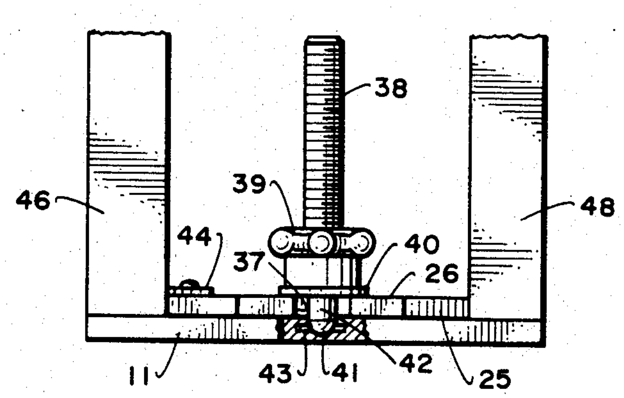
FIG. 4 is a rear vertical view of a portion of the apparatus of FIG. 1.

As seen in FIG. 4, a clevis 41 is mounted on and upstanding from base plate 11. The shaft of bolt 38 terminates in a reduced end 42 fitting into clevis 41 and retained therein for pivotal movement by a pivot pin 43.

It can also be seen in both FIGS. 1 and 4 that an indicator plate 44 is fixedly secured on the upper surface of plate 26 by rivets 45 or the like (FIG. 1) and extends to and adjacent support leg 46 upstanding on base plate 11. Indicia 47 is provided on leg 46, as, for example, numbers 0,5,10,15,20, etc. to indicate the degree of angularity of plate 26 with respect to base plate 11.

Second leg 48 is also mounted on and is upstanding from base plate 11 and spaced from leg 46 as shown in FIG. 1. A cross-bar 49 interconnects the upper ends of legs 46,48. A pair of C-shaped brackets 50,51 are mounted on the upper surface of bar 49 opening upwardly as shown in FIG. 1 for reasons to be discussed further hereinbelow.

A plurality of vertically spaced holes 52,53, respectively, are provided in each leg 46,48, respectively. Holes 52 in leg 46 are horizontally aligned with holes 53 in leg 48.

A cross-rod 54 is mounted in aligned holes 52,53 and, as is obvious, can be moved up and down legs 46,48 by placement in differing aligned holes. The spaced legs 55,56 of a yoke member 57 are secured in position in jig 10 by means of a rod 54 passing through apertures 58 (only the aperture 58 in leg 56 being visible in FIG. 1) in yoke member 57. As seen in FIG. 1, the outside width of legs 55,56 is generally the same as the inside width between legs 46,48 so that yoke member 57 fits relatively snugly therebetween.

Legs 55,56 extend to a Y-shaped portion having angled members 59,60 (interconnected to legs 55,56, respectively) meeting at elongated side-by-side members 61,62 thus forming a Y with legs 55,56 as shown.

A pair of upstanding spaced vertical rods 63,64, respectively, extend from each boss 27,28, respectively. A block member 65 has a throughbore 66 for receiving one of the rods, as rod 64, and may be secured in position by a set screw, such as an allen screw 67 extending through block member 65 and engaging rod 64. An elongated rectangular block member 68 extends between rods 63,64 having each rod 63,64 passing through apertures 69,70, respectively, in block member 68. Block member 68 has a snug fit with respect to rods 63,64 but is movable therealong.

Figure 5:
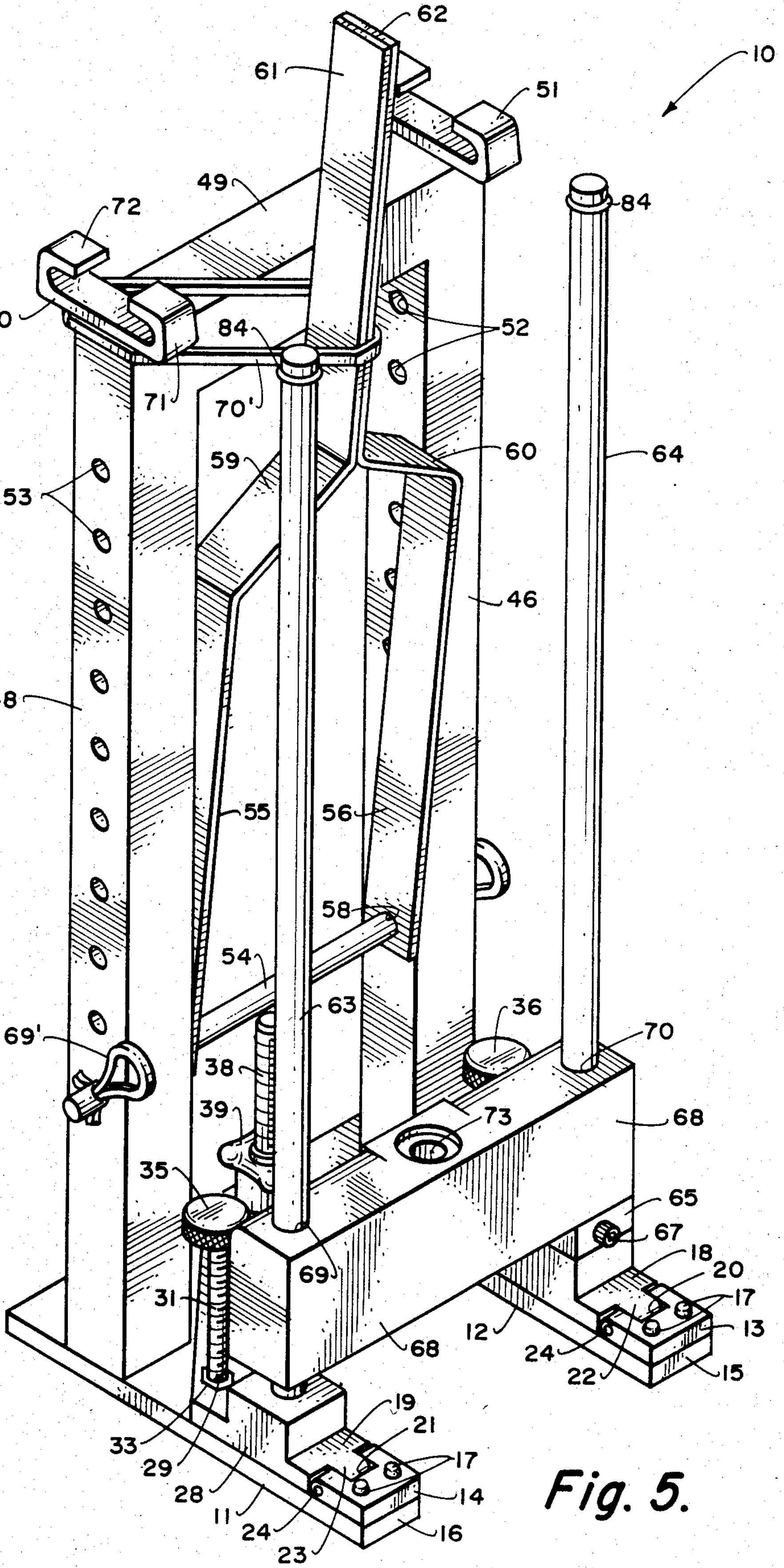
FIG. 5 is a vertical perspective view of the jig of FIG. 1 showing the yoke member or handle thereof in upright position.

Cotter pins 69' (only one visible in FIG. 1) may be used to secure rod 54 in position in aligned holes 52,53. A resilient member, such as an elongated rubber band 70' may be hooked on one of the curved legs of one of the brackets 50,51 (such as legs 71,72 of bracket 50) for holding the members 61,62 (and thus yoke member 57) in fixed upright position for storage or the like as shown in FIG. 5.

Figure 2:
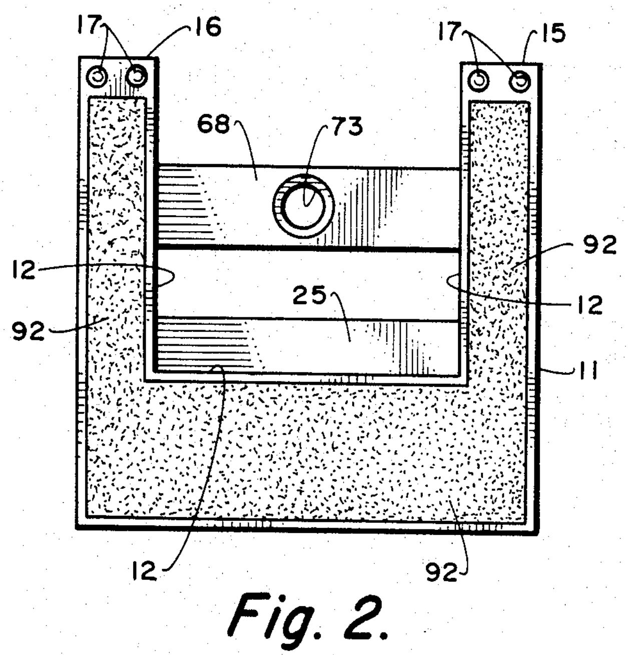
FIG. 2 is a bottom end view of the jig of FIG. 1.
Figure 6:
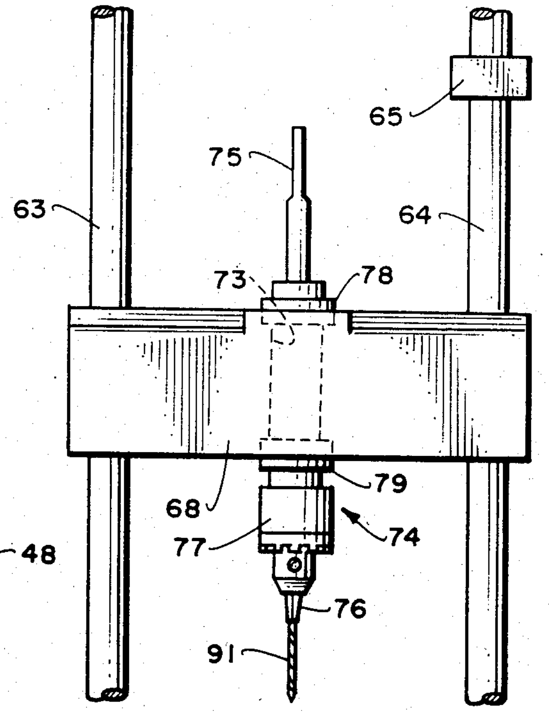
FIG. 6 is a vertical view of one of the members of the jig of FIG. 1 removed therefrom with drill apparatus installed thereon.

It can be seen in FIGS. 1 and 2 that an aperture 73 extends through block member 68. Referring now to FIG. 6, jig 10 may be provided with conventional drill apparatus 74 for carrying out the invention. Such apparatus 74 may include a shaft 75 for engagement by the chuck of a conventional drill (to be discussed) for rotation of drill bits, such as a bit 91 which is preferably a high quality safe carbide drill bit, retained in the jaws 76 of drill chuck 77. Suitable bearing members 78,79 on opposite sides of drill apparatus 74 retain the drill apparatus 74 in position in block member 68. Thus, referring to both FIGS. 1 and 6, it can be seen that drill apparatus 74 can be quickly and easily mounted in the aperture 73 in block member 68 so that jig 10 may be stored with either the drill apparatus 74 in place, or removed therefrom. It is to be understood that suitable internal components of drill apparatus 74 are provided for transmitting rotation of shaft 75 to rotation of jaws 76 (thus any bit carried thereby) as is well known in the drilling art and the general teachings of which form no part of the invention other than in the environment set forth herein.

Figure 7:
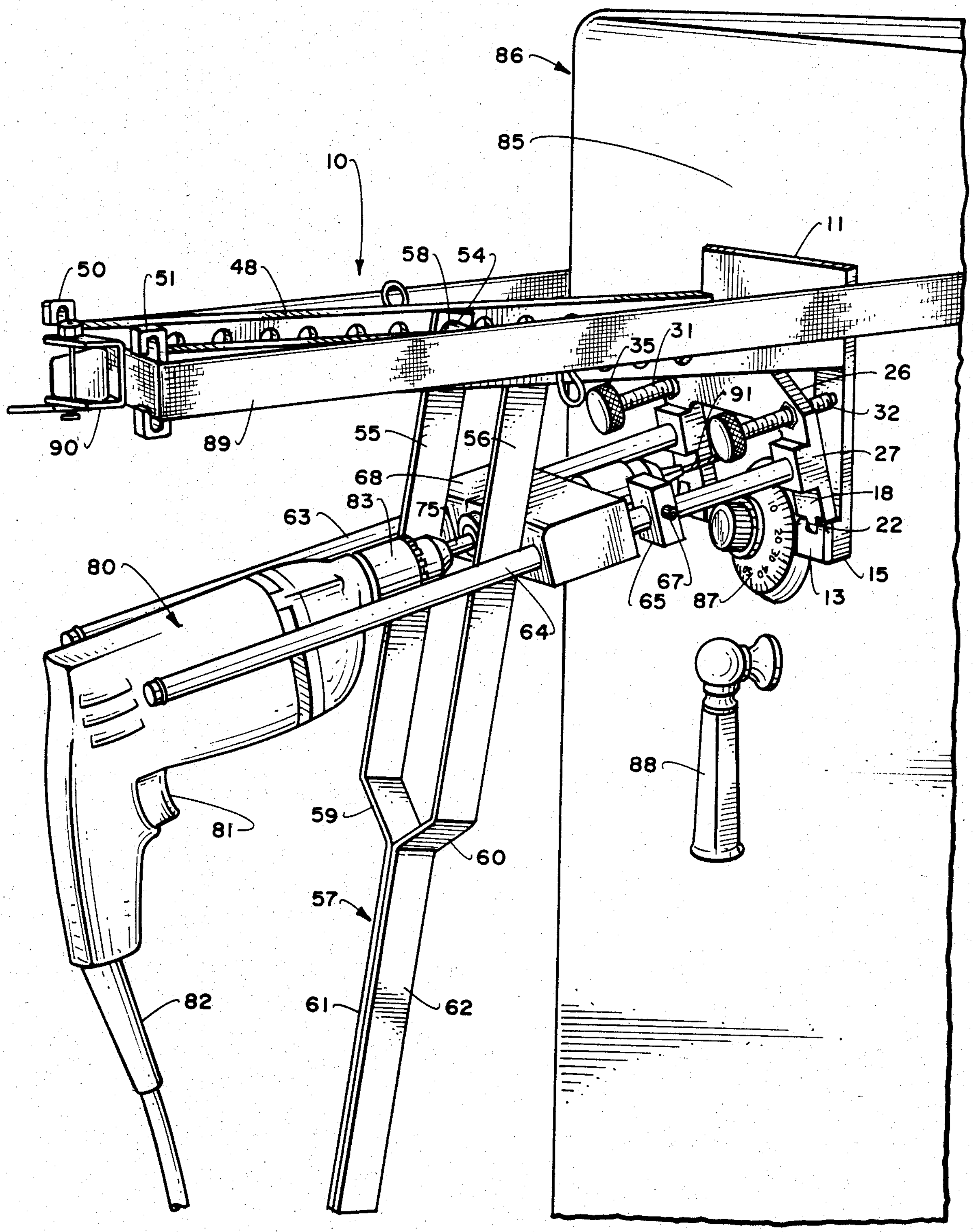
FIG. 7 is a vertical perspective view of the complete apparatus of the invention in position for drilling out the lock of a safe.

The operation of the jig 10 of FIGS. 1 to 5, when assembled with the drill apparatus 74 of FIG. 6, is shown in FIG. 7. As seen therein, a conventional drill 80, having a trigger 81, a power cord 82, and a chuck 83, all of which is conventional, is coupled to shaft 75 (see also FIG. 6) permitting rotation of shaft 75 (and thus bit 91 in jaws 76) when drill 80 is activated via trigger 81.

As seen in FIGS. 1 and 7, resilient rings 84 are disposed at the upper ends of each rod 63,64. Drill 80 fits between rods 63,64. The base plate 11, as seen in FIG. 7, abuts flat against the front wall 85 of a conventional safe 86 having a conventional combination lock 87 and handle 88 thereon. As can be seen, the cut-out section 12 of plate 11 (FIG. 2) straddles lock 87 so that the lock 87 is between legs 15,16. Tilt plate 26 is pivoted about pins 24 (FIG. 3) so that drill bit 91 is properly aligned with the safe's lock 87 when screws 31,32 are tightened; the lower ends thereof abutting the upper surface of bottom plate 11 (FIG. 1). As seen in FIG. 1, plate 44 indicates the angle of tilt of plate 26. The stop washer 40 and turn nut 39, when tightened, prevent upward movement (to the left in FIG. 7) of tilt plate 26 and nuts 33,34 on screws 31,32 respectively, are screwed down. Block member 65 is moved along rod 64, then tightened thereto via set screw 67, to thereby place block member 65 in a predetermined position along rod 64. Block member 65 thus acts as a depth indicator during drilling as will be discussed. Anti-skid material 92 (FIG. 2) may be applied to the undersurface of base plate 11.

The brackets 50,51 may be used to secure a tie down strap 89 passing therethrough having an adjustable ratchet buckle 90, to safe 86 as shown in FIG. 7. Buckle 90 is conventional and any suitable adjustable fastener may be used.

Yoke member 57 is located, via rod 54, in suitable aligned apertures 52,53 in legs 46,48 and pivoted to abut against block member 68.

It can be seen that plate 26 can be either a flat FIG. 1 position or angled as in FIG. 7. Thus, drill 80 can be actuated to drill either straight in or at a pre-set angle. That is screws 31,32 and turn nut 39 can be adjusted to preset the angle desired and indicated on upright post or leg 46 via plate 44 and indicia 47.

The drill assembly can be tilted via plate 26 during drilling to check the hole being drilled without disconnecting the apparatus from the safe.

FIG. 7 illustrates the use of the apparatus on a free standing safe or the like; if the safe was in the floor, the strap 89 (or straps) can be secured to suitable anchor shields positioned in the floor.

Any suitable drill may be used, such as one of ball bearing construction having an RPM of about 4000–5000. In straight-in drilling where plate 26 is in the FIG. 1 position, light pressure is applied to yoke member 57. When the bit 91 (see also FIG. 6) contacts the safe material and starts to cut, this light pressure should be maintained. Work is made easy using the apparatus herein an excessive pressure will break the drill bit causing time delay. When drilling at an angle as in FIG. 7, light pressure is again applied to yoke member 57 and, when bit 91 contacts the safe material and starts to cut, light pressure can again be maintained.

In summary, apparatus 10 may be attached to the safe without handle or yoke member 57 using tie down straps around a free standing safe, or ties to lead anchor shields or the like for floor model safes. The straps are placed through brackets 50,51 and ratcheted tight via ratchet buckle 90. The jig is now adjusted to the position to be drilled as heretofore discussed by tightening screws 31,32 and turn nut 39. The tilt plate 26 hold down nut 39 should be quite secure when drilling straight in and plate 26 is in the FIG. 1 position. Drill 80 may now be attached to the drill shaft 75 and yoke member 57 now attached as heretofore described. The depth stop block member 65 is moved down rod 64 out of the way until drill bit 91 encounters hardplate. Hardplate varies in thickness with different safe manufacturers and, if unknown, block member 65 can be moved up to the bearing guide block 68 and measurements made to drill down to 1/16th to ⅛th of an inch at a time until penetration is made through the hardplate. If the door thickness is known, the drill bit 91 can be placed against the door and measurements made between the blocks 68 and 65 to determine the desired depth of penetration. Hole depth can be checked by quickly and easily loosening nut 39 and rotating the FIG. 7 assembly out of the way. If desired, yoke member 57 can be quickly and easily removed at this time so that an unobstructed view of the hole drilled is present. The drilled hole can be checked using a safe light or bore scope. When angle drilling, if the angle is known, the nut 39 is rotated to loosen tilt plate 26 and tilt plate screws 31,32 turned until the pointer or indicator plate 44 is at the angle desired. The tilt plate held down nut 39 is now tightened and angle drilling can be made. Since the depth of drilling will be greater due to drilling at an angle, the stop block 65 should always be used.

Any suitable materials may be used, such as various strong plastics, metals such as steel, cast aluminum, etc. for the parts of jig 10.

It can be seen that there is shown an apparatus for drilling out the tumblers of the lock of a safe in order to quickly and easily gain entry into the interior thereof. Although the apparatus has been described herein as particularly suited to drilling out safe tumblers, it can obviously be used in any appropriate drilling situation where a drill press is called for but it is impractical to use a big drill press. A lesser amount of drill bits will be necessary in drilling safes or the like using the technique and apparatus disclosed herein as contrasted with prior art techniques. Also since fewer blades are used, elapsed time spent to do the job is reduced.

Since certain changes may be made in the above apparatus without departing from the scope of the invention herein involved, it is intended that all matter contained in the above description and shown in the accompanying drawings shall be interpreted as illustrative and not in a limiting sense.

We claim:

1. An apparatus for drilling out the tumblers of a safe or the like comprising:
   - a flat base plate having a cut-out portion therein;
   - a tilt plate pivotally connected to said base plate on opposite sides of said cut-out portion;
   - tilt plate angle adjusting means engaging both said base plate and said tilt plate for tilting said tilt plate in an angular relationship to said base plate and preventing said tilt plate from accidentally pivoting toward said base plate;
   - lock means associated with both said tilt plate and said base plate for locking said tilt plate in a direction away from said base plate;
   - a first pair of spaced support members extending vertically upwardly from said base plate, remote from said cut-out portion;
   - a plurality of aligned vertically spaced apertures in each of said support members;
   - a second pair of spaced support members extending vertically upwardly from said tilt plate;
   - a block member having a vertical throughbore connected to said second pair of support members having said second pair of support members passing therethrough, said block member being movable along said second pair of support members;
   - a handle member fixedly and removably secured to said first pair of said support members above said block member, said handle member being a Y-shaped member having a first pair of spaced legs coupled to each of said first pair of support members by a removable rod extending through both aligned apertures in each of said first pair of support members and in said spaced legs, said spaced legs extending to and meeting at an elongated handle portion, said Y-shaped member being pivotal with respect to said first pair of support members and adapted to abut against said block member; and
   - a drill shaft extending through said throughbore in said block member, bearing means on opposite sides of said block member surrounding said throughbore receiving said shaft therethrough, said shaft being rotatable within said bearing means and having a first portion on one side of said block member adapted to be connected to the chuck of a drill and a second portion on the other side of said block member connected to a chuck retaining a drill bit therein, said Y-shaped member being unconnected to said block member and independent thereof but abutting against and bearing down against said block member, when said drill shaft extends through said throughbore, with said spaced legs disposed on opposite sides of said drill shaft between said chuck retaining said drill bit therein, and said block member, thereby enabling said drill shaft to rotate within said bearing means while said Y-shaped member can be pivoted against said block member.

2. In the apparatus of claim 1 including a support member interconnecting the free upper ends of said first pair of spaced upright members.

3. In the apparatus of claim 2 including a pair of spaced U-shaped flanges mounted on the upper surface of said support member adjacent each of said first pair of spaced upwardly extending members.

4. In the apparatus of claim 1 including a depth indicating block mounted on one of said second pair of spaced upwardly extending members having an adjusting screw for fixedly securing said block to said upwardly extending member at any desired location therealong.

5. In the apparatus of claim 1 wherein said first lock means includes at least one turn screw threaded into a threaded aperture in said tilt plate having its lower end abutting against said base plate and its upper end terminating in a head.

6. In the apparatus of claim 1 wherein said second lock means includes a threaded shaft extending vertically upwardly from said base plate, said tilt plate having an open-ended slot receiving said shaft therein and a turn nut threaded on said shaft above said slot.

7. In the apparatus of claim 6 wherein said tilt plate is generally trapezoidally-shaped and includes a portion disposed between said first pair of support members and freely movable therebetween.

8. In the apparatus of claim 1 including angle indicating means on both said tilt plate and one of said first pair of support members for indicating the angle of said tilt plate with respect to said base plate.

9. In the apparatus of claim 8 wherein said angle indicating means includes an indicator on said tilt plate, and indicia on one of said first pair of support members, said indicator extending thereto.

10. In the apparatus of claim 1 including a drill motor connected to said first portion.

11. In the apparatus of claim 10 including a support member interconnecting the free upper ends of said first pair of spaced upright members and a pair of spaced U-shaped flanges mounted on the upper surface of said support member adjacent each of said free upper ends of said first pair of support members receiving a tie down strap therein.

* * * * *